US008617266B2

(12) United States Patent
Bang et al.

(10) Patent No.: US 8,617,266 B2
(45) Date of Patent: Dec. 31, 2013

(54) HYDROGEN GENERATING APPARATUS USING STEAM REFORMING REACTION

(75) Inventors: Jin Hwan Bang, Daejeon (KR); Young Dae Kim, Daejeon (KR); Myung Jun Kim, Daejeon (KR)

(73) Assignee: SK Innovations Co., Ltd., Seoul (KR)

( * ) Notice: Subject to any disclaimer, the term of this patent is extended or adjusted under 35 U.S.C. 154(b) by 445 days.

(21) Appl. No.: 12/734,446

(22) PCT Filed: Oct. 21, 2008

(86) PCT No.: PCT/KR2008/006213
§ 371 (c)(1),
(2), (4) Date: Apr. 30, 2010

(87) PCT Pub. No.: WO2009/057909
PCT Pub. Date: May 7, 2009

(65) Prior Publication Data
US 2011/0097251 A1 Apr. 28, 2011

(30) Foreign Application Priority Data
Nov. 2, 2007 (FR) .................. 10-2007-0111628

(51) Int. Cl.
*C01B 3/02* (2006.01)
*C01B 3/36* (2006.01)
*B01J 7/00* (2006.01)

(52) U.S. Cl.
USPC ............ 48/61; 48/197 R; 422/625; 423/648.1

(58) Field of Classification Search
USPC ........ 48/61, 76, 75, 86 R, 105; 165/162, 161, 165/159; 422/625
See application file for complete search history.

(56) References Cited

U.S. PATENT DOCUMENTS

| 6,096,106 A * | 8/2000 | Ruhl et al. ................... 48/197 R |
| 6,153,152 A | 11/2000 | Ruhl et al. |
| 2003/0192251 A1* | 10/2003 | Edlund et al. ................. 48/127.9 |
| 2004/0159046 A1* | 8/2004 | Komaki et al. .............. 48/127.9 |
| 2007/0251387 A1* | 11/2007 | Edlund et al. ....................... 96/7 |

FOREIGN PATENT DOCUMENTS

| EP | 1094031 | 4/2001 |
| EP | 1245532 | 10/2002 |
| EP | 1767492 | 3/2007 |
| GB | 930209 | 7/1963 |
| JP | 2004-288434 A | 10/2004 |

OTHER PUBLICATIONS

Supplementary European Search Report dated Mar. 2, 2011 regarding Application No. EP 08 84 4509.
Chinese Patent Application No. 200880114285.4, Office Action dated Dec. 17, 2012, and English language translation; 8 pages.

\* cited by examiner

*Primary Examiner* — Matthew Merkling
(74) *Attorney, Agent, or Firm* — Abelman, Frayne & Schwab

(57) ABSTRACT

Disclosed herein is a hydrogen generating apparatus for producing hydrogen from a hydrocarbon feed through a steam reforming reaction, in which a pressure drop device is installed between a feed distributor and each of reactor tubes in order to prevent the feed from being unevenly distributed to the reactor tubes. In the hydrogen generating apparatus, the pressure drop device for artificially dropping the supply pressure of the feed is installed between the feed distributor and each of the reactor tubes which are concentrically arranged with respect to a heat source. Accordingly, if the feed is unevenly distributed, the pressure drop device can suppress an abnormal temperature rise in some of the reactor tubes to induce the smooth production of hydrogen and to greatly improve the operational safety of the hydrogen generating apparatus.

2 Claims, 4 Drawing Sheets

HYDROGEN GENERATING APPARATUS USING STEAM REFORMING REACTION

CROSS-REFERENCE TO RELATED APPLICATIONS

This application is a National Phase of PCT/KR2008/006213, filed Oct. 21, 2008, which claims priority from Korean Application No. 10-2007-0111628, filed Nov. 2, 2007, which are incorporated herein by reference.

TECHNICAL FIELD

The present invention relates to an apparatus for generating hydrogen using a steam reforming reaction, and more particularly to a heat exchanger-integrated hydrogen generating apparatus for producing hydrogen from a hydrocarbon feed through a steam reforming reaction, in which a pressure drop device dropping the supply pressure of a feed is installed between each of catalyst-packed reactor tubes and a feed distributor or a reformed gas distributor so as to artificially cause a pressure drop large enough to remove the influence of an uneven pressure drop caused by the catalytic bed, such that it is possible to prevent the hydrocarbon feed from being distributed unevenly to the reactor tubes or to prevent a reformed gas containing hydrogen from being unevenly discharged.

BACKGROUND ART

Generally, fuel cells are power generation systems that convert chemical energy into electric energy by an electrochemical reaction between hydrogen and oxygen to produce electricity and water as a byproduct.

Such fuel cells are expected to substitute for internal combustion engines due to their excellent energy efficiency, and thus it is considered that the stable supply of hydrogen is essential for the use of fuel cells as an alternative energy source in the near future.

Methods for supplying hydrogen to fuel cells include methods of producing hydrogen by the electrolysis of water, and methods of producing hydrogen by reforming hydrogen-containing feeds with steam (steam reforming reaction).

Herein, many kinds of hydrocarbons including natural gas, LPG, naphtha, volatile oil and kerosene can be used as the feeds.

Also, the steam reforming reaction occurs in the presence of a catalyst at high temperature.

Thus, a catalyst is required in places in which the steam reforming reaction occurs, and heat required for the steam reforming reaction must be supplied.

In the prior art, a method was used in which heat required for the steam reforming reaction was generated in a separate place, and then the generated heat was transferred to a hydrogen generating apparatus. However, this method has problems in that it is inconvenient to use and difficult to manage.

Accordingly, in recent years, the inside of a hydrogen generating apparatus was divided into two sections by a tubular or plate-shaped metal, such that one section could be used as a steam reforming section (reforming section), and the other section could be used as a section for generating the heat required for steam reforming reactions (combustion section).

Namely, heat required for steam reforming reactions is transferred to the hydrogen generating apparatus by transferring heat generated in the combustion section to the reforming section (steam reforming section).

Herein, a catalyst in the reforming section is, in most cases, located in catalytic reaction tubes of a small diameter, and several catalytic reaction tubes are symmetrically placed around a heat source depending on the capacity and size of the hydrogen generating apparatus.

However, in this hydrogen generating apparatus according to the prior art, there is a high possibility for a feed to be unevenly distributed. If this uneven distribution of the feed occurs, a reactor tube supplied with a relatively small amount of the feed can undergo a rise in temperature corresponding to unabsorbed reaction heat, thus causing abnormal phenomena by high-temperature deformation. This will now be described in detail.

In a process of packing the reactors with catalysts formed of grains such as spherical or cylindrical pellets, the catalyst grains are randomly packed and, as a result, the difference in pressure between the front and back ends of the catalytic bed will necessarily differ between the catalytic reaction tubes.

The non-uniform pressure drop caused by the catalytic bed as described above causes different amounts of fluid to flow through the reactors.

The pressure drop in the catalyst-packed reactors is well known in the art to which the present invention pertains, for example, as shown in the Ergun equation.

The present invention aims to artificially cause a pressure drop which is several-fold greater than the pressure drop caused by the catalytic bed so as to minimize the influence of the pressure drop caused by the catalytic bed among the overall pressure drop across the reactors, thus preventing a non-uniform flow in each reactor tube.

A prior Japanese patent similar to the present invention shows an example in which an orifice having a diameter of 0.4 mm is provided as a pressure drop means in order to make uniform flow in each reactor tube of a hydrogen generating apparatus.

DISCLOSURE

Technical Problem

However, in the prior Japanese patent, the precise machining of the orifice is required, and the possibility for the performance of the orifice to be influenced by dust generated in the front end of the catalytic bed is high. In addition, the size of the orifice changes as a result of thermal expansion during high-temperature operation and a non-uniform heat distribution. Thus, it is anticipated that the performance of the orifice will be less than expected.

Accordingly, the present invention has been made in order to solve the above-described problems occurring in the prior art and aims to drop the pressure of a supply of a feed to each of reactor tubes so as to prevent the feed from being unevenly distributed to the reactor tubes and, at the same time, suppress an abnormal temperature rise in the reactor tubes, such that the smooth production of hydrogen can be achieved.

It is an object of the present invention to provide an apparatus for generating hydrogen using a steam reforming reaction, in which a pressure drop device for dropping the supply pressure of a feed is installed between each of catalyst-packed reactor tubes and a feed distributor or a reformed gas distributor so as to artificially cause a pressure drop large enough to remove the influence of an uneven pressure drop caused by the catalytic bed, such that it is possible to prevent the hydrocarbon feed from being distributed unevenly to the reactor tubes or to prevent a reformed gas containing hydrogen from being unevenly discharged.

Another object of the present invention is to provide a pressure drop device for a hydrogen generating apparatus, which is easy to manufacture and install, can easily control the degree of pressure drop, is not greatly influenced by dust generated in reactor tubes and can resiliently cope with thermal deformation caused by high-temperature operation.

Still another object of the present invention is to provide an apparatus for generating hydrogen using a steam reforming reaction, which can suppress an abnormal temperature rise in some reactor tubes to induce the smooth production of hydrogen and to improve the operational safety of the apparatus.

Technical Solution

To achieve the above objects, the present invention provides an apparatus for generating hydrogen using a steam reforming reaction, the apparatus comprising: a reforming section having installed therein a plurality of catalyst-packed reactor tubes for a steam reforming reaction which reforms a hydrocarbon feed with steam to produce hydrogen; a combustion section having installed therein a heat source for generating heat required for a steam reforming reaction in the reactor tubes; and distribution means for supplying the hydrocarbon feed to the reactor tubes and discharging hydrogen produced through the steam reforming reaction, wherein a pressure drop device capable of artificially dropping the supply pressure of the hydrocarbon feed so as to evenly distribute the hydrocarbon feed to each of the reactor tubes is installed between the distribution means and each of the reactor tubes.

Advantageous Effects

According to the construction of the present invention as described above, the pressure drop device is installed between the feed distributor and each of the reactor tubes so as to artificially drop the supply pressure of the hydrocarbon feed, so that the hydrocarbon feed is evenly distributed to each of the reactor tubes concentrically arranged with respect to the heat source.

Accordingly, the abnormal temperature rise in the reactor tubes occurring as a result of the uneven distribution of the hydrocarbon feed can be suppressed to induce the smooth production of hydrogen and to greatly improve the operational safety of the hydrogen generating apparatus.

In addition, the pressure drop device according to the present invention is easy to manufacture and install, can easily control the supply pressure of the hydrocarbon feed, is not greatly influenced by dust generated in the reactor tubes and can resiliently cope with thermal deformation caused by high-temperature operations, and thus it can greatly improve the productivity and convenience of use of the hydrogen generating apparatus during the long-term use thereof.

DESCRIPTION OF IMPORTANT REFERENCE NUMERALS USED IN THE FIGURES

| | |
|---|---|
| 1: hydrogen generating apparatus; | 2: combustion section; |
| 3: reforming section; | 10: heat source; |
| 20: reactor tubes; and | 30: pressure drop device. |

[ Mode For Invention]

Hereinafter, preferred embodiments of the present invention will be described in detail with reference to the accompanying drawings.

Figure 1:
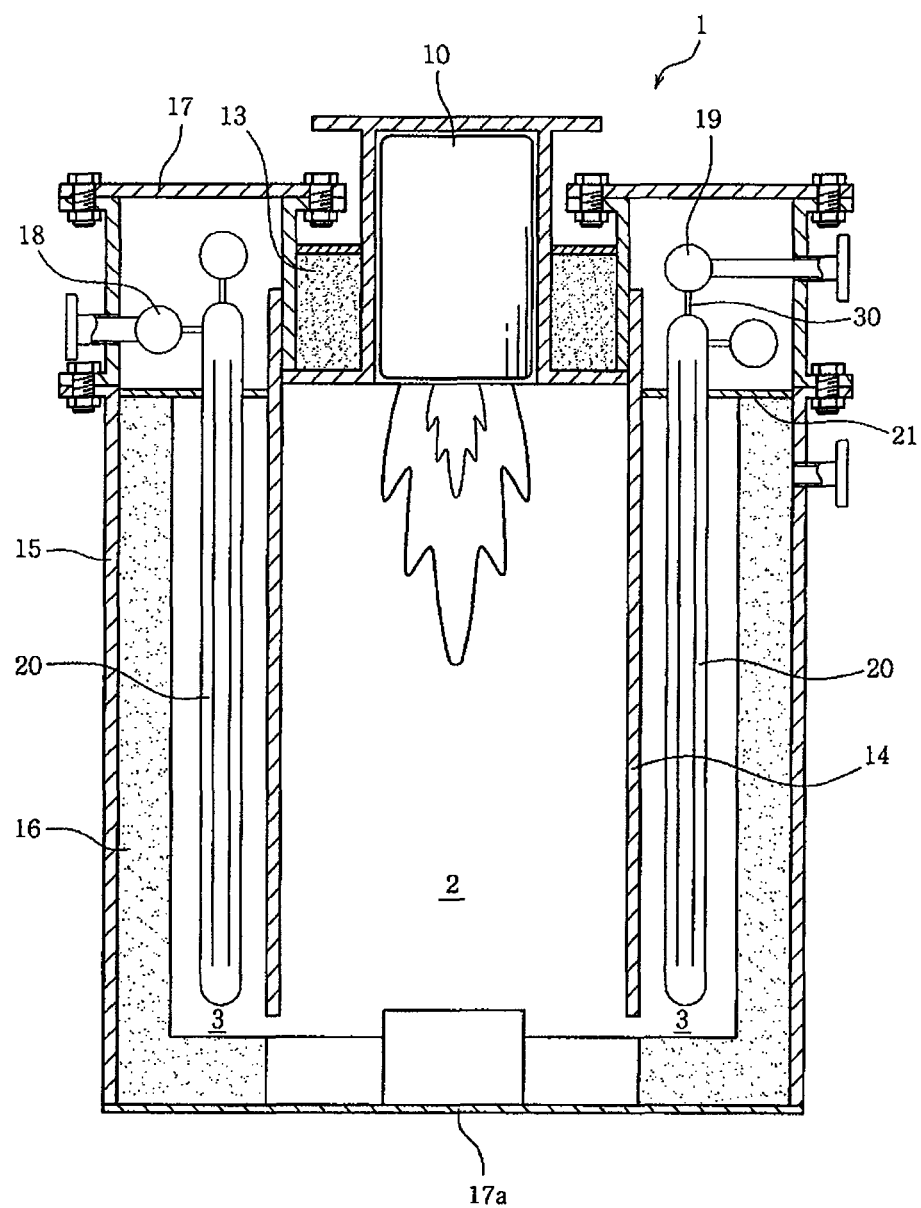
FIG. 1 is a cross-sectional view showing the construction of a hydrogen generating apparatus according to the present invention.

FIG. 1 is a cross-sectional view showing an embodiment of a hydrogen generating apparatus according to the present invention, and shows the overall construction and combination of elements of the heat exchanger-integrated hydrogen generating apparatus which comprises catalyst-packed reactor tubes, a combustion section and the like.

Figure 2:
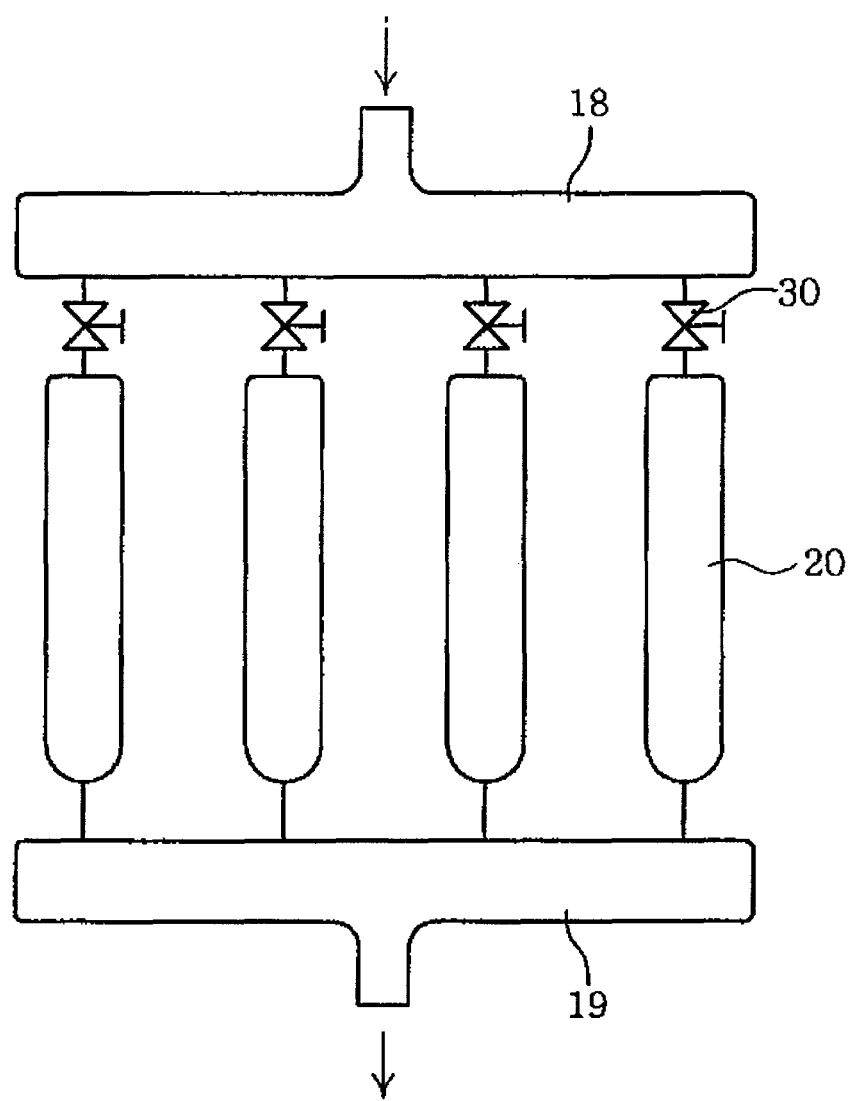
FIG. 2 is a schematic diagram showing the construction of a hydrogen generating apparatus having a pressure drop device installed therein.

FIG. 2 is a schematic diagram showing the construction of a hydrogen generating apparatus provided with a pressure drop device and shows the pressure drop device for dropping the supply pressure of a hydrocarbon feed installed between a feed distributor and each of reactor tubes.

Figure 3:
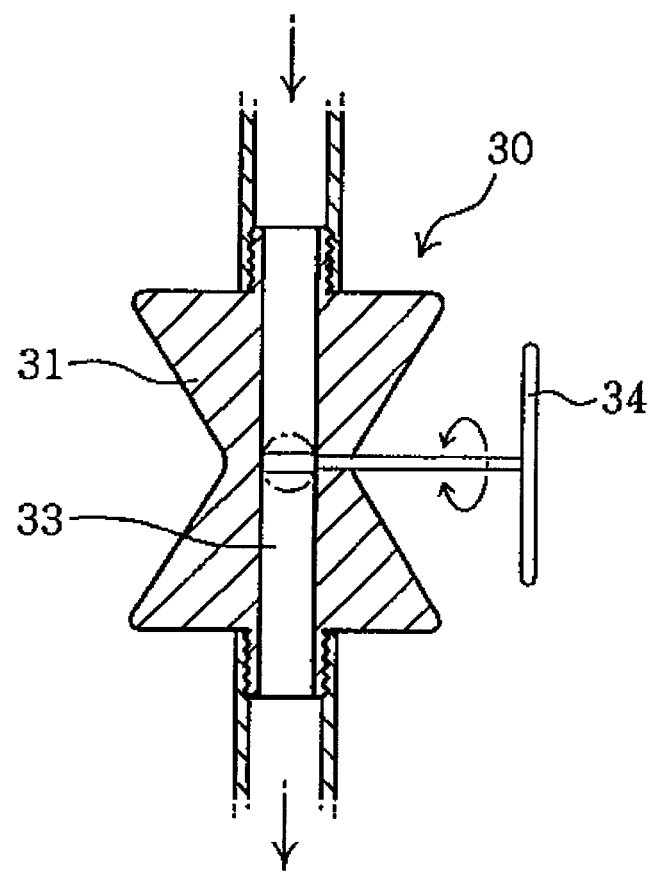
FIG. 3 is a cross-sectional view showing an example of a pressure valve.

FIG. 3 is a cross-sectional view showing an example of a pressure drop device and shows the construction of a pressure valve having a feed flow control passage formed therein.

Figure 4:
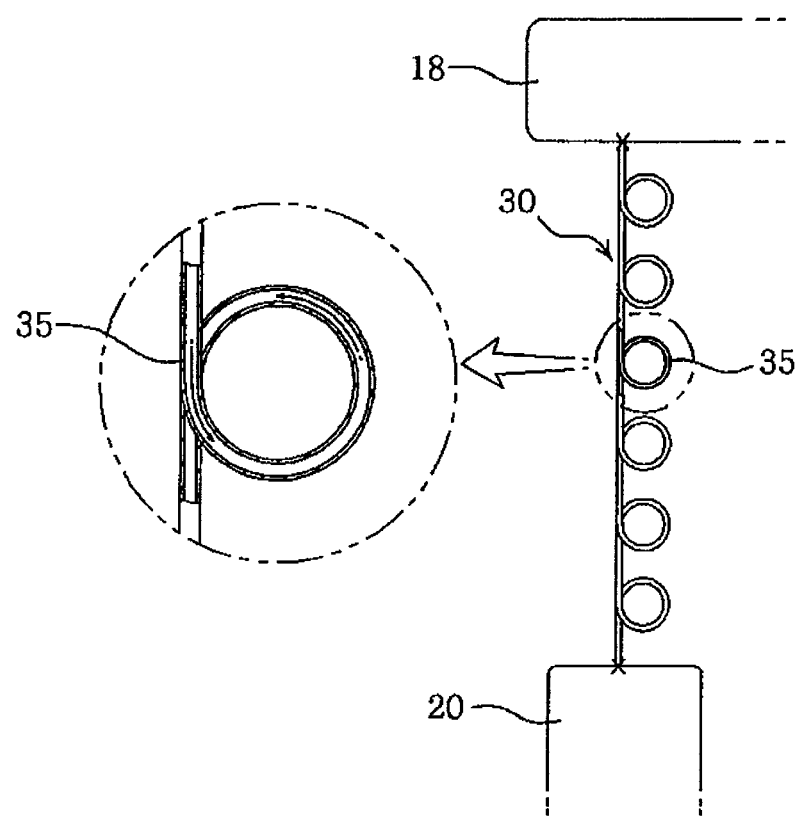
FIG. 4 is a partial cross-sectional view showing an example of a pressure drop tube.

FIG. 4 is a partial cross-sectional view showing an example of a pressure drop tube, and shows the construction of the pressure drop tube having a coil shape which is of an inner diameter small enough and a length long enough so as to be able to cause a pressure drop from the wall side of the reactor tubes.

Specifically, as shown in FIG. 1, a hydrogen generating apparatus 1 according to the present invention is divided into a combustion section provided with a heat source 10, and a reforming section 3 for reforming a hydrocarbon feed with steam.

Although a burner is mainly used as the heat source installed in the combustion section 2, it is to be understood that the scope of the present invention is not necessarily limited thereto and that all known heating devices for generating heat required for a steam reforming reaction, such as a burner, are applicable in the present invention.

Accordingly, because the heat source 10 performing such a role is installed in the hydrogen generating apparatus, a refractory material is disposed around the heat source 10 so as to prevent a high-temperature flame from coming in direct contact with the metal material of the heat source and, at the same time, minimize the heat loss of the heat source, thus increasing the efficiency of the heat source.

A flame guide 14 is placed in the hydrogen generating apparatus 1 including the refractory material 13 so that the combustion section 2 for generating heat required for the reforming reaction is defined in the inside of the apparatus 1, and such that exhaust gas generated in the combustion section 2 flows to the reforming section 3, transferring heat required for the reforming reaction.

In the reforming section 3 defined by the flame guide 14 in the hydrogen generating apparatus 1, a plurality of catalyst-packed reactor tubes 20 are placed. Through the action of the catalyst packed in the reactor tubes 20, the hydrocarbon feed is reformed with steam to produce hydrogen.

Although it is shown in the figure that the reactor tubes 20 according to the present invention have a circular shape, are sectioned into two parts and are placed in the reforming section 3 using an upper coupling plate 21, it is to be understood that this is merely one example and that the scope of the present invention is not necessarily limited thereto.

Also, the reactor tubes 20 are mainly concentrically arranged with respect to the heat source 10, such that they can efficiently utilize heat in a minimized space.

The hydrogen generating apparatus 1 is generally covered with an outer casing 15, such that the hydrogen generating apparatus 1 is protected from the external environment or external influences. Particularly, an insulation material 16 or the like is attached to the inner surface of the outer casing 15 to prevent heat loss from occurring.

Also, as shown in FIG. 1, the upper and lower ends of the hydrogen generating apparatus 1 are finished with an upper cover 17 and a lower cover 17a. Below the upper cover 17, distribution means for supplying the feed to the reactor tubes 20 and discharging hydrogen produced by a steam reforming reaction are placed.

Herein, the distribution means consists of a feed distributor 18 for supplying the hydrocarbon feed to the reactor tubes 20, and a reformed gas distributor 19 for discharging hydrogen produced by a steam reforming reaction. In the embodiments of the present invention as shown in FIGS. 1 and 2, the feed distributor 18 is disposed below the upper cover 17, and the reformed gas distributor 19 is disposed adjacent to or opposite the feed distributor 18.

Each of the feed distributor 18 and the reformed gas distributor 19 has a passage through which the hydrocarbon feed or hydrogen can move, such that they allow the hydrocarbon feed to be supplied to the reactor tubes 20 or allow hydrogen produced by the reforming reaction to be smoothly discharged to a place in need thereof.

Accordingly, because the hydrogen generating apparatus 1 according to the present invention is constructed as described above, the hydrocarbon feed is supplied to each of the reactor tubes through the feed distributor 18, and heat generated from the heat source 10 installed in the combustion section 2 is supplied to the reforming section 3, such that the hydrocarbon feed and the heat are heat-exchanged with each other.

In this process, a steam reforming reaction is induced through the action of steam and the catalyst, and hydrogen is produced by the steam reforming reaction in the reactor tubes 20 and finally discharged to the outside through the reformed gas distributor 19 so as to be used in fuel cells, etc.

Meanwhile, between the feed distributor 18 for supplying the hydrocarbon feed and each of the reactor tubes 20 to which the hydrocarbon feed is supplied, the pressure drop device 30 is installed such that it can drop the supply pressure of the hydrocarbon feed to prevent the hydrocarbon feed from being distributed unevenly to each of the reactor tubes 20.

Herein, although the pressure drop device 30 may additionally be installed between each of the reactor tubes 20 and the reformed gas distributor 19 for discharging hydrogen produced by the steam reforming reaction to the outside, it is to be understood that the following embodiment of the present invention will be described based on the pressure drop device 30 installed between the feed distributor 18 and each of the reactor tubes 20.

Specifically, as shown in FIG. 2, the pressure drop device 30 is installed between the feed distributor 18 and each of the reactor tubes 20, such that the supply pressure of the feed can artificially drop.

For this purpose, the pressure drop device 30 can be provided in various forms. Particularly, in order to achieve further improved distribution performance, the pressure drop device 30 is provided in a form which is easy to manufacture and install, can easily control the supply pressure of the hydrocarbon feed, is not greatly influenced by dust generated in the reactor tubes 20 and can resiliently cope with thermal deformation caused by high-temperature operation.

An example of the pressure drop device 30 satisfying such conditions is shown in FIG. 3. As shown therein, a pressure valve 31 having a feed flow control passage 33 controllably formed therein is used to connect each of the reactor tubes 20 and the feed distributor 18 so as to drop the supply pressure of the feed supplied from the feed distributor 18.

Specifically, the hydrocarbon feed supplied from the feed distributor 18 passes through the feed flow control passage formed in the pressure valve 31, and if a non-uniform pressure drop occurs depending on the packing degree of each catalytic bed, the feed flow control passage 33 is made narrow using a pressure control handle 34, such that non-uniform flow caused by the catalytic bed can become uniform, and thus uniform pressure is applied to each of the reactor tubes 20.

Accordingly, even if the flow of each fluid changes because of the catalytic bed, the pressure valve 31 drops the supply pressure of the hydrocarbon feed depending on the amount of the catalyst packed in the reactor tubes 20 by controlling the feed flow control passage 33. In this state, the hydrocarbon feed is evenly distributed to the reactor tubes 20, thus preventing abnormal phenomena caused by high-temperature deformation from occurring due to the excessive heat absorption of the reactor tubes 20 resulting from the lack of the hydrocarbon feed in the process of absorbing heat generated from the heat source 10.

Another example of the pressure drop device 30 satisfying the above-described conditions is shown in FIG. 4. As shown therein, the pressure drop device 30 consists of a pressure drop tube 35 having a diameter smaller than that of the reactor tubes 20, such that the supply pressure of the hydrocarbon feed drops during passage through the pressure drop tube 35.

Also, the pressure drop tube 35 is provided in a coil form, such that it can resiliently absorb deformation caused by thermal expansion during the high-temperature operation of the hydrogen generating apparatus 1.

With respect to the most highly preferred example of the pressure drop tube 35, if fluid with a pressure of 8 kg/cm$^2$ flows through the reactor tubes 20 having a 2-5 mm sized catalyst packed in a one meter length catalytic bed, the pressure drop tube 35 having a diameter of 3 mm is installed at a length of about one meter between the feed distributor and each of the reactor tubes 20. In this case, the pressure drop tube 35 artificially drops the supply pressure of the hydrocarbon feed, such that the hydrocarbon feed is always evenly distributed to the reactor tubes 20.

Specifically, if the above pressure drop tube 35 is used to connect the feed distributor 18 with each of the reactor tubes 20, the hydrocarbon feed supplied from the feed distributor 18 drops its supply pressure during passage through the pressure drop tube 35 and, in this state, is supplied to the reactor tubes 20, and thus the hydrocarbon feed is evenly distributed to each of the reactor tubes 20.

With respect to the most highly preferred form, the pressure drop tubes 35 having different lengths are installed between the feed distributor 18 and the reactor tubes 20, such that the hydrocarbon feed can always be evenly distributed to the reactor tubes 20, even if the catalyst is non-uniformly packed in the reactor tubes 20.

Specifically, the pressure drop tubes 35 having varying lengths depending on the amount of catalyst packed are connected with the feed distributor 18, such that the feed can always be evenly distributed to each of the reactor tubes 20.

Accordingly, because the pressure drop tubes 35 performing such a role generally are of the same length, or preferably different lengths, and connect the feed distributor 18 with each of the reactor tubes 20, they drop the supply pressure of the feed, such that the feed is evenly distributed to each of the reactor tubes 20.

Meanwhile, as described above, the pressure drop device 30 according to the present invention is installed between the reformed gas distributor 19 and each of the reactor tubes 20, such that it controls the pressure of reformed gas uniformly for each reactor tube 20, thus achieving the same effect as described above.

The invention claimed is:

1. An apparatus for generating hydrogen using a steam reforming reaction, the apparatus comprising:
    a reforming section having installed therein a plurality of catalyst-packed reactor tubes for a steam reforming reaction which reforms a hydrocarbon feed with steam to produce hydrogen;
    a combustion section having installed therein a heat source for generating heat required for the steam reforming reaction which takes place in the reactor tubes; and
    distribution means for supplying the hydrocarbon feed to the reactor tubes and discharging hydrogen produced through the steam reforming reaction,
    wherein a pressure drop device capable of intentionally dropping the supply pressure of the hydrocarbon feed so as to evenly distribute the hydrocarbon feed to each of the reactor tubes is installed between the distribution means and each of the reactor tubes,
    wherein the inside of the apparatus is divided into two sections, the reforming section and the combustion section, by a tubular metal, and the each of the reactor tubes are concentrically arranged with respect to the heat source,
    wherein the pressure drop device consists of a pressure drop tube, which is formed of a tube having a small diameter and of long length, such that the supply pressure of the hydrocarbon feed drops during passage through the pressure drop tube;
    wherein the pressure drop tube is provided in a coil form, such that it can absorb deformation caused by thermal expansion in high-temperature operation,
    wherein the pressure drop tubes having different lengths depending on a amount of catalyst packed are installed between a feed distributor and the reactor tubes.

2. The apparatus of claim 1, wherein the pressure drop tube is formed with a diameter of 3 mm and installed at a length of about one meter between a feed distributor and each of the reactor tubes.

* * * * *